Nov. 18, 1969   H. HERBST ET AL   3,478,462
APPARATUS FOR ASCERTAINING LOAD CONDITIONS IN A DRAGNET
Filed March 18, 1966   3 Sheets-Sheet 1
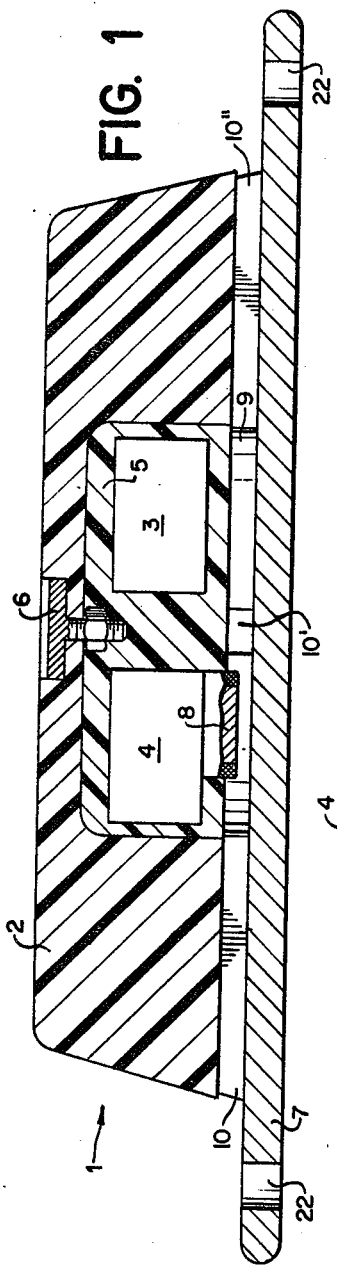
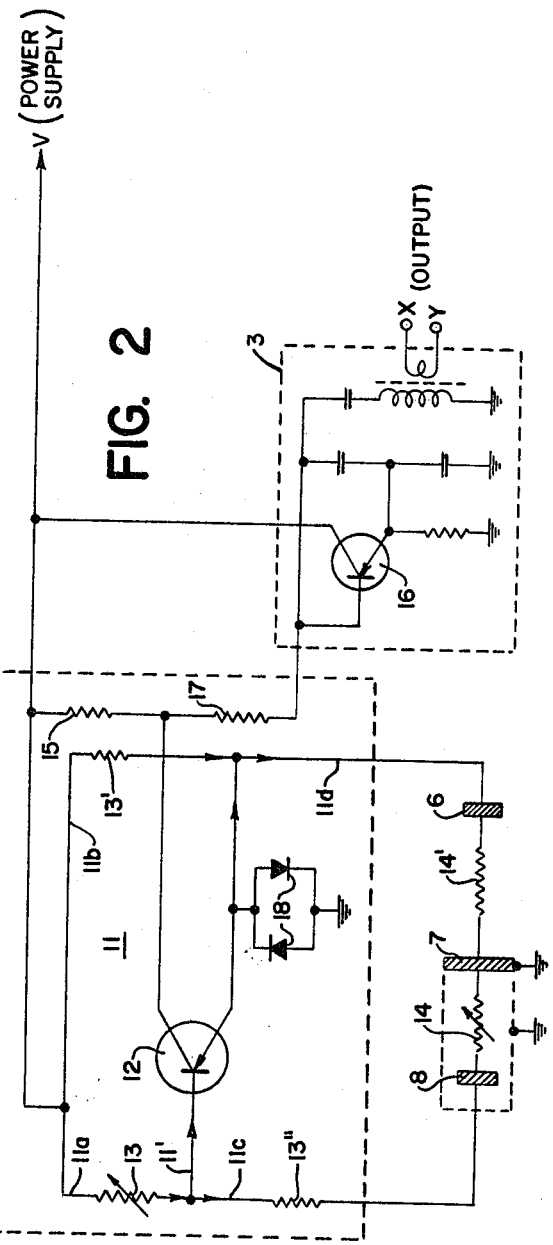
INVENTORS
HAGEN HERBST, et al
BY
*Nolte and Nolte*
ATTORNEYS Nov. 18, 1969 H. HERBST ET AL 3,478,462
APPARATUS FOR ASCERTAINING LOAD CONDITIONS IN A DRAGNET
Filed March 18, 1966 3 Sheets-Sheet 2
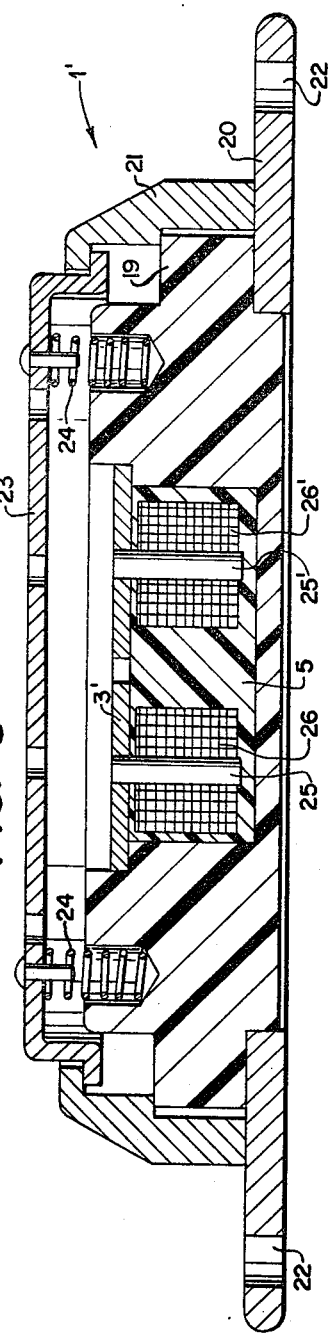
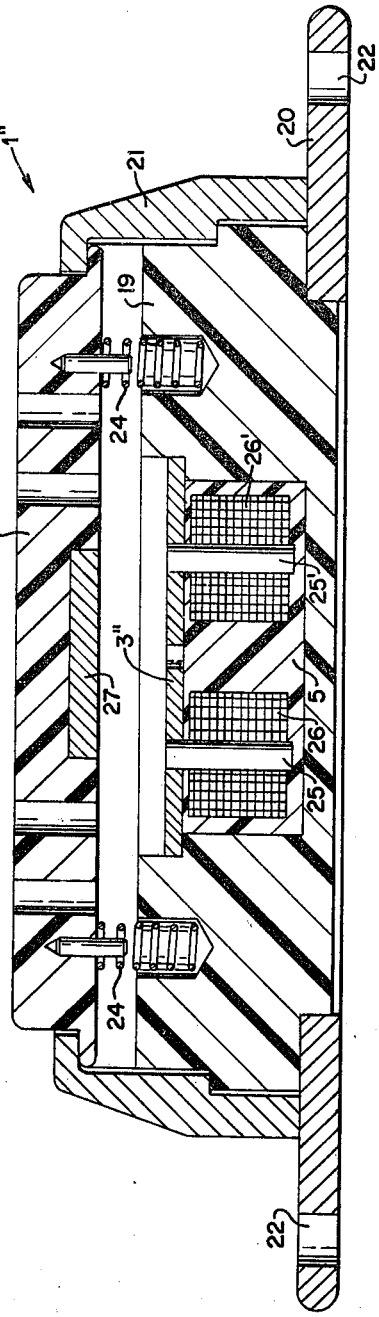
INVENTORS
HAGEN HERBST, et al
BY
*Nolte and Nolte*
ATTORNEYS

United States Patent Office 3,478,462
Patented Nov. 18, 1969

3,478,462
APPARATUS FOR ASCERTAINING LOAD
CONDITIONS IN A DRAGNET
Hagen Herbst, Eckhart Kleedehn, and Herbert Pietrucha,
Wolgast, Germany, assignors, by mesne assignments, to
VEB Funkwerk Kopenick
Filed Mar. 18, 1966, Ser. No. 535,388
Int. Cl. A01k 73/10
U.S. Cl. 43—9                    15 Claims

ABSTRACT OF THE DISCLOSURE

Apparatus for ascertaining the load conditions in a fishing net includes means for sensing the presence of fish at a predetermined position in the net. An output signal is produced by oscillator means and is communicated to a display device at a remote point.

---

The invention relates to a apparatus for ascertaining load conditions in a dragnet.

Measuring devices for determining the degree to which a net is filled are known in which the tension of the tow line, i.e., the resistance of the dragnet or fishing net as well as the position of a shearing board are used as means to determine the degree to which the net is filled.

Furthermore, devices are known in which the mechanical tensions in the filled tail section are indicated when opposing forces in a tension switch, or as pressure signals, operating on the inner wall of the tail section, trigger a pressure responsive device, whereupon resistors are cut into an electric circuit.

In further known methods and devices used for determining the degree to which the net is filled, light sources and light receivers are oppositively arranged in the net or ultra-sonic measuring probes and radio active methods are used.

Furthermore, methods and devices are known which determine the degree to which the tail section is filled, by direct electrical means, utilizing variations in transfer resistors in response to electrodes, or a series of electrodes mounted within the tail section and arranged directly opposite to each other, or diagonally with respect to each other.

The known methods do not operate reliably due to a great variance in the parameters and require a separate transmission cable for transmitting the measured values.

It is, therefore, an object of the invention to provide improved apparatus for ascertaining the degree to which a dragnet is filled.

It is a further object of the invention to provide transmission of the information as to the degree to which a net is filled back to the ship, undisturbed by the variations of the transmission line parameters. Such transmission may be done by a separate channel or by way of other equipment used to control the net.

It is a further object of the invention to provide improved apparatus to ascertain electronically the degree to which fishing nets are filled particularly by employing oscillators.

In accordance with the invention, the information about the degree to which a dragnet is filled is transmitted electronically by measuring probes, preferably arranged on the upper side along tall sections of the net, by keying-in or keying-out of oscillators, which are integral with the measuring probes, the signals having different frequencies in accordance with respective tail sections. This information is indicated digitially via a separate transmitting system, or by a transmitting system using a common channel wih other devices associated with the net.

A measuring probe comprises preferably a housing on- to which a measuring electrode is mounted on a face thereof and is directed to the inside of the tail. A detachable counter-electrode is mounted on another side of the housing preferably opposite of the face thereof. Between the counter-electrode and the housing, a hollow space is formed accessible to sea water by means of grooves and or bores. A comparing electrode and an oscillator are coupled to a trigger device which is built into the housing and extends into the hollow space. A measuring path is formed by the measuring electrode, the sea water and the counter-electrode while a comparing path is formed by the comparing electrode, the sea water and the counter-electrode, each path forming an arm portion of a bridge circuit. A semi-conductor device such as a transistor having base, emitter and collector electrodes is included in the diagonal of the bridge circuit and its operation is controlled by the detection effected by the conditions sensed by the measuring electrode and by the subsequent unbalance of the bridge circuit under certain conditions. The triggering of the oscillator is accomplished through the resulting change in the collector voltage of the transistor disposed in the diagonal of the bridge circuit. The counter-electrode which is mounted on the measuring probe acts simultaneously as a counter-electrode and as a shield for the comparing path effecting compensations for the variations in the conductance value of the water. The counter-electrode is positively poled to avoid an electrolytic wear of the measuring electrode and the comparing electrode.

In accordance with a further feature of the invention, the measuring probes are provided with a pressure plate made of an electrically conductive, or non-conductive material and which is formed as a trigger device and is disposed on the inside of the tail. The measuring probes which may be of the oscillating, or non-oscillating types in their inoperative position, and which may be mounted on a molded member, become triggered when they become covered by a mass of fish, since the pressure exerted thereon by the fish mass reduces the distance between the pressure plate and the oscillators, and the thereby resulting change of the magnetic coupling flux causes triggering of the transistor. When using pressure plates made of electrically conducting material together with oscillators which oscillate in their inoperative position, a reduction of the coupling flux occurs due to the approach of the pressure plate upon contact thereof with the fish mass, whereby the oscillators become triggered. When using pressure plates made of an electrically non-conductive material, and oscillators which do not oscillate in their inoperative position, a yoke of ferromagnetic material mounted inside of the pressure plate is provided. By an above described approach of the pressure plate, an enlargement of the coupling flux and triggering of the oscillator is attained. The measuring probes are formed as floating bodies or are combined with floating bodies.

The inventive apparatus make it possible to determine the degree to which the nets are filled, independently from external influences.

An already existing transmitting channel to the receiver may be used for transmitting the information of the degree of the filling.

The invention will become more readily apparent from the following description of preferred embodiments thereof shown in the accompanying drawings, in which:

FIG. 1 is a cross-sectional view of a compensated, galvanically triggered measuring probe;

FIG. 2 is a circuit diagram of the measuring probe of FIG. 1;

FIG. 3 is a cross-sectional view of an inductively triggered measuring probe with an attenuation disc for reducing the coupling flux;

FIG. 4 is a cross-sectional view of an inductively triggered measuring probe with a coupling yoke for increasing the coupling flux;

Figure 5:
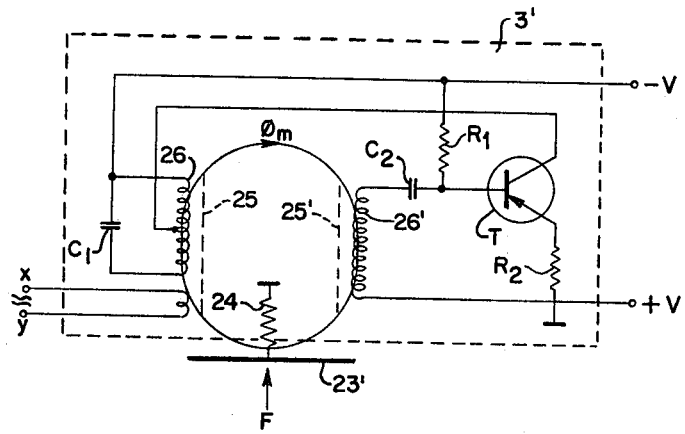
FIG. 5 is a circuit diagram of the measuring probes in accordance with FIGS. 3 and 4.

Preferably, a plurality of measuring probes is mounted on the upper part of the tail with a predetermined distance between adjacent probes, while the probes are connected electrically in parallel relation with respect to each other.

With reference to FIG. 1, a measuring probe 1 consists of a housing 2 made of a non-conducting and non-hygroscopic material, into which an oscillator 3 and an electronic trigger device 4 are built in, as two separate transistorized construction elements. These construction elements are sealed water-tight in cast resin 5. A measuring electrode 6 is mounted in a recess on a face portion of housing 2, which face portion is directed to the inside of the net, while a detachable counter-electrode 7 is mounted to the rear side of housing 2. A comparing electrode 8 is provided directly on the trigger device and extends from cast resin 5 and is directed towards the inner side of counter-electrode 7. Hollow space 9 is formed between counter-electrode 7 and comparing electrode 8, comprising grooves 10, 10', and 10'' which are accessible to the sea water. For securing probe 1 to the net, bores 22 are provided on counter-electrode 7.

With reference to FIG. 2, trigger device 4 consists of a bridge 11 into the diagonal 11' of which a transistor 12 is connected. Bridge arms 11a, 11b and 11c include resistors 13; 13'; 13'' and transfer resistor 14, respectively, while arm 11d includes transfer resistor 14', the transfer resistors being formed by the space accessible to the sea water between measuring electrode 6 disposed in arm 11d, and counter electrode 7 which is grounded, as well as comparing electrode 8 in arm 11c and counter electrode 7, respectively. A comparing section is formed including a path extending from comparing electrode 8, through the sea water to counter electrode 7, which path is effective to compensate the variations in the conductance of the water. Variations in sea water conductance, which are caused by varying salt content and temperature of the water are sensed by variations of the transfer resistors 14 and 14' which experience a proportional change in their conductance so that the balance of the bridge remains unaffected by variations in sea water conductance. When measuring electrode 6 becomes covered over by fish, the transfer resistor 14' between the measuring electrode 6 and the counter-electrode 7 experiences a change in its value which in turn causes a variation of the electrical potential at measuring electrode 6. Since comparing electrode 8 is shielded against the fish mass and the electric potential at the latter electrode remains uneffected, therefore bridge 11 becomes unbalanced and transistor 12 disposed in the diagonal 11' of the bridge is so operable that the voltage drop across its load resistor 15 is reduced, whereby a transistor 16 associated with oscillator 3 receives a base bias voltage through base resistor 17 necessary for the onset of oscillation. Supply voltage to the circuit is obtained from a power supply through terminal V. Oscillator 3 includes, in a manner known in the art, capacitors and inductances to form a desired oscillating circuit, not described here in detail. Oscillator 3 couples to the transmitting channel with its output terminals X and Y. The measuring section formed by measuring electrode 6, counter-electrode 7 and the sea water may be interchanged with the comparing section formed by comparing electrode 8, through counter-electrode 7 to the sea water as indicated in the bridge circuit of FIG. 2. For protecting transistor 12 against overloading, a pair of oppositely poled parallel connected diodes 18 are provided in the emitter circuit of the transistor 12.

Figure 7:
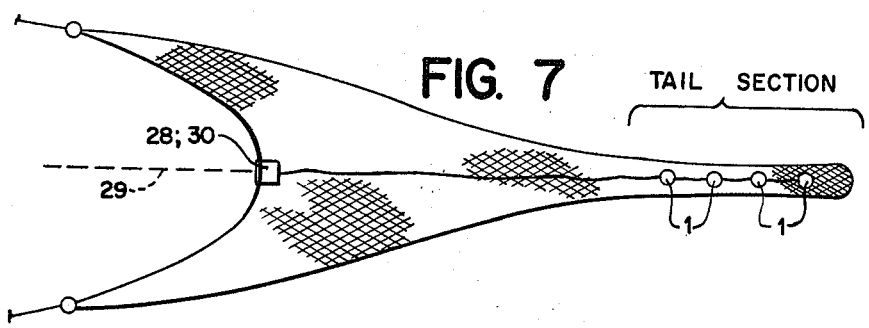
FIG. 7 is a plan view of a dragnet showing positioning of the measuring probes.
Figure 8:
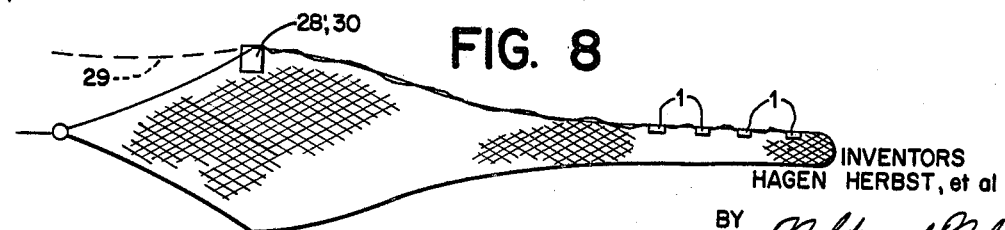
FIG. 8 is a side view of the dragnet in accordance with FIG. 7.

With reference to FIG. 3, measuring probe 1' consists of a molded housing 19 made from a non-conductive material. In housing 19, oscillator 3' is mounted and set into a cast resin 5. Molded housing 19 is retained on a base plate 20, by means of a retaining ring 21. For securing measuring probe 1' on the net, base plate 20 is provided with bores 22. A pressure plate 23 for triggering oscillator 3' is provided on the open side of retaining ring 21, and is biased to an inoperative position by means of a compression spring 24 when the net is empty. The pressure plate 23 is made from sea-water resistant and electrically conductive materials. Measuring probe 1' with its pressure plate 23, the latter acting as a triggering device, is directed inwardly of the tail at sections as shown in FIGS. 7 and 8. When a certain section of the tail is filled with fish, pressure plate 23 which is yieldably mounted in retaining ring 21, is pressed against the force of compression springs 24 in the direction of oscillator 3', whereby the existing coupling flux between coils 26 and 26' of oscillator 3' which are mounted on separate cores 25 and 25', is strongly reduced so that the oscillations are disrupted. Thereby, the frequency which is assigned to the section of the net associated wtih the particular probe 1' will not be available on the receiver side, so that the degree to which the net is filled at the particular instance will be indicated by a holding circuit. The magnetic type measuring probe 1' may have an oscillator 3' the equivalent circuit of which is shown in FIG. 5, from which it is seen that the oscillator includes a pair of coils 26, 26' around cores 25, 25', respectively. The magnetic flux $\phi_m$ coupling the two coils is varied by pressure plate 23 supported on springs 24. As mentioned above, as the tail section to which probe 1' is attached becomes filled with fish, the mass of fish exerts a force F on pressure plate 23 whereupon flux conditions change due to the varying distance between the pressure plate and the cores 25, 25'. The oscillator includes further capacitors $C_1$ and $C_2$ and a semi-conductor device such as a transistor T having base, emitter and collector electrodes arranged in circuit relationship with capacitors $C_1$ and $C_2$ as well as resistors $R_1$ and $R_2$ to complete the oscillator circuit. As mentioned above, the oscillator circuit in the embodiment of probe 1' in FIG. 3 is designed to oscillate under "no load" conditions, on plate 23 whereas oscillations become interrupted during impression of load on pressure plate 23. Supply voltage to the oscillator is available through terminals V±, whereas oscillator output is available at output terminals X—Y.

With reference to FIG. 4 in which like elements with those of FIG. 3 are designated by similar reference characters, pressure plate 23' of measuring probe 1'' consists of a sea-water resistant and electrically non-conducting material and has, on the side directed toward oscillator 3'', disposed a core yoke 27 made from ferromagnetic material. During filling of a tail section with fish, pressure plate 23' of the associated measuring probe 1'' will be pressed against the force of compression of springs 24 in the direction of oscillator 3'', which in this embodiment is set not to oscillate in its rest position. Approaching of yoke 27 toward cores 25, 25', causes the coupling flux between coils 26 and 26' to increase and oscillation is initiated. The frequency which is assigned to the respective tail section will be transmitted to the receiver and the degree to which the tail is filled will be indicated by a triggered load circuit.

Figure 6:
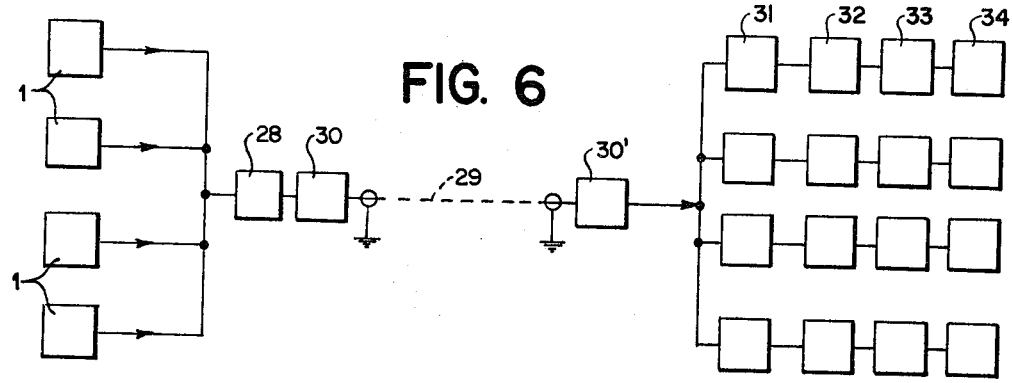
FIG. 6 is a block diagram relating to the inventive method.

During operation, the output of the oscillators of the measuring probes which might be any of the above described types, are amplified by a linear amplifier 28 and fed into a transmitter system 29, which might be a coaxial cable as shown in FIGS. 6, 7 and 8. If a common transmitter system 29 is used jointly with other electric equipment which may be connected to the fishing net, the oscillations which indicate the degree of filling are read into such common transmitter system 29 and are decoupled therefrom by frequency filters 30 and 30'. The received information from individual probes reporting the filling of a particular tail section are separated again into individual channels by means of selective amplifiers 31. Electronic switching devices 33 are controlled by the rectified voltage obtained by means of rectifiers 32 from the transmitted information on the amount of filling, which rectified voltage controls a signal lamp 34 turned on when the corresponding net section is filled with fish. It is seen from FIG. 6 that elements 31–34 associated with a particular measuring probe are similar for all probes and for sake of simplicity, only operation of such elements with respect to one probe has been described.

Although the invention has been described with reference to specific embodiments thereof, it is not intended that the invention should be limited to such embodiments only.

What we claim is:

1. In an apparatus for ascertaining load conditions in a fishing net, at least one mass detecting means disposed at a predetermined position in said fishing net for detecting presence of a fish mass at said position, said mass detecting means comprising proximity sensing means and oscillator means for producing an output signal in response to exposure thereof to said fish mass at said position, and means responsive to said output signal for communicating information to a display device disposed remotely of said mass detecting means.

2. The combination according to claim 1, wherein said proximity sensing means comprises a measuring electrode and a counter electrode, a bridge circuit arranged in electrically balanced relationship with respect to the water path between said electrodes and connected in circuit relationship with said oscillator means to effect operation thereof when said balanced relationship is disturbed by the proximity of said fish mass, thereby producing said output signal in said oscillator means.

3. The combination as claimed in claim 2, further including a comparing electrode disposed between said measuring electrode and counter-electrode, the water path between said comparing and counter-electrodes forming a comparing branch in said bridge circuit, the water path between said measuring and counter-electrodes forming a measuring branch in said bridge circuit, said bridge circuit comprising variable resistance means adapted to vary in proportion with the conductance and temperature variation of the water paths to compensate the effect of such variations of water on said bridge circuit.

4. The combination as recited in claim 3, further including a semiconductor trigger device operatively disposed in the diagonal of said bridge circuit for producing an actuating signal when said bridge circuit becomes unbalanced, and means for transferring said actuating signal to said oscillator means to effect a change in its operational condition.

5. The combination as claimed in claim 4, wherein said mass detecting means comprises a housing, said measuring electrode forming a face portion of said housing, said counter-electrode forming a detachable back portion of said housing, passage means formed in said housing for communicating water to an internal portion of said housing containing said comparing electrode, said passages being sufficient in size to protect said comparing electrode from the fish mass.

6. The combination as recited in claim 5, wherein said bridge circuit and said oscillator means are sealed in said housing in a water-tight fashion exposing to water only said comparing, said measuring and counter electrodes.

7. The combination as recited in claim 3, wherein said counter-electrode is at an electric potential higher than the potential of said measuring electrode and said comparing electrode.

8. The combination as recited in claim 1, wherein said proximity sensing means comprises a pressure responsive means adapted to be displaced by pressure exerted thereon by a fish mass, magnetic means coupled to said pressure responsive means for varying magnetic flux conditions in an associated magnetic circuit, said oscillator means being coupled to said magnetic circuit responsive to variations of flux therein to produce said output signal.

9. The combination as recited in claim 8, wherein said oscillator means is energized at the rest position of said pressure responsive means.

10. The combination as recited in claim 9, wherein said pressure responsive means is a spring biased disc of electrically conductive material adapted to decrease said flux when displaced by said fish mass toward said magnetic circuit thereby turning off said oscillator means.

11. The combination as recited in claim 8, wherein said oscillator means is deenergized at the rest position of said pressure responsive means.

12. The combination as recited in claim 11, wherein said pressure responsive means is a spring-biased disc of ferromagnetic material adapted to increase the flux when displaced by said fish means toward said magnetic circuit thereby turning on said oscillator means.

13. The combination as recited in claim 1, wherein said mass detecting means is of buoyant characteristic.

14. The combination as recited in claim 1, wherein a plurality of said mass detecting means are disposed at predetermined positions in a tail section of a dragnet, and the output signals from respective oscillator means being adapted to identify said portions.

15. The combination as recited in claim 1, further including transmission cable means for coupling said mass detecting means to said display device, said device being disposed on a boat pulling said net.

References Cited

UNITED STATES PATENTS

| 3,299,559 | 1/1967 | Luketa | 43—9 |
| 2,156,452 | 5/1939 | Guyman | 43—9 |

FOREIGN PATENTS

| 26,072 | 11/1963 | Germany. |
| 26,357 | 10/1963 | Germany. |
| 31,523 | 9/1964 | Germany. |
| 36,850 | 2/1965 | Germany. |

WARNER H. CAMP, Primary Examiner